Nov. 12, 1929. N. J. PERRYMAN 1,735,473
ELECTRICAL SYSTEM
Filed Sept. 18, 1924 3 Sheets-Sheet 1

Nov. 12, 1929.  N. J. PERRYMAN  1,735,473
ELECTRICAL SYSTEM
Filed Sept. 18, 1924  3 Sheets-Sheet 2
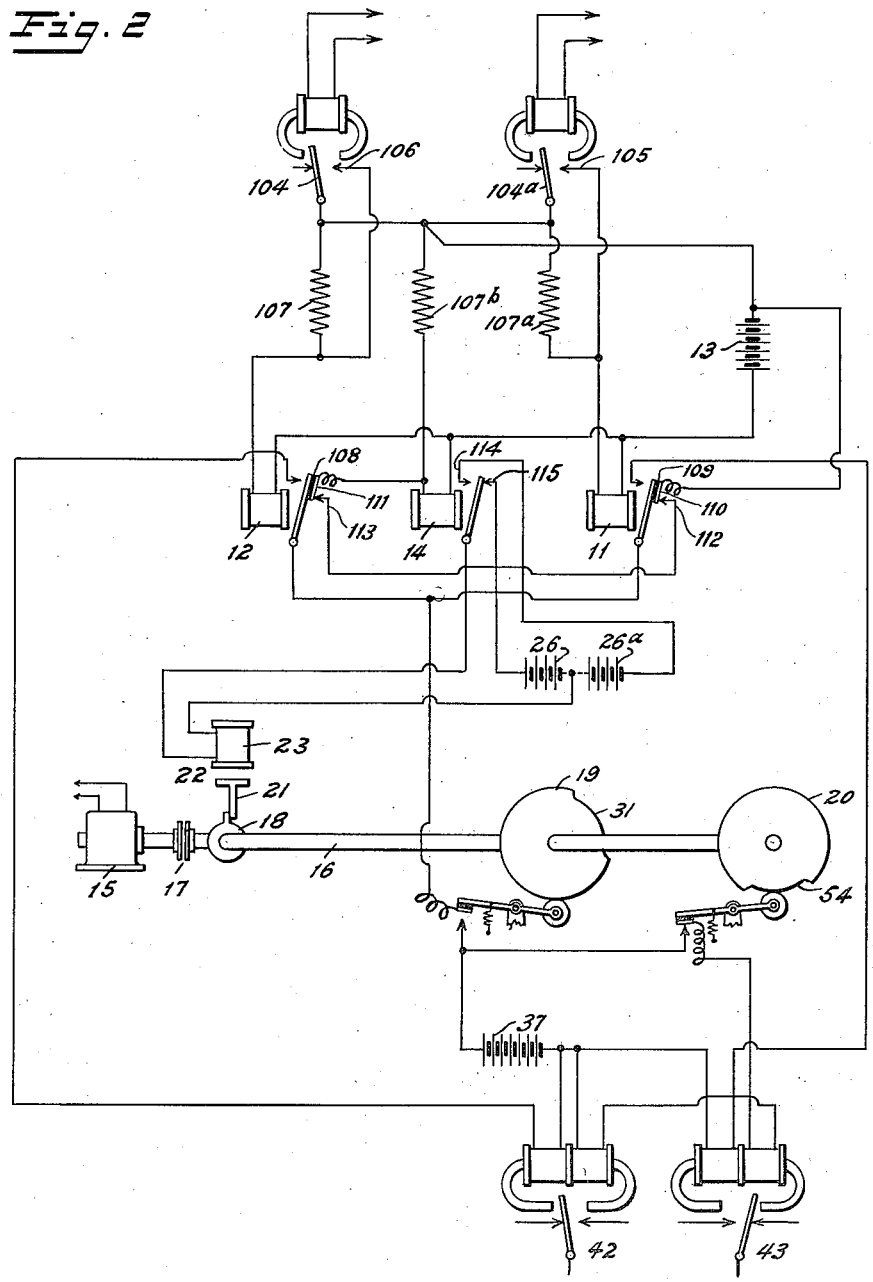

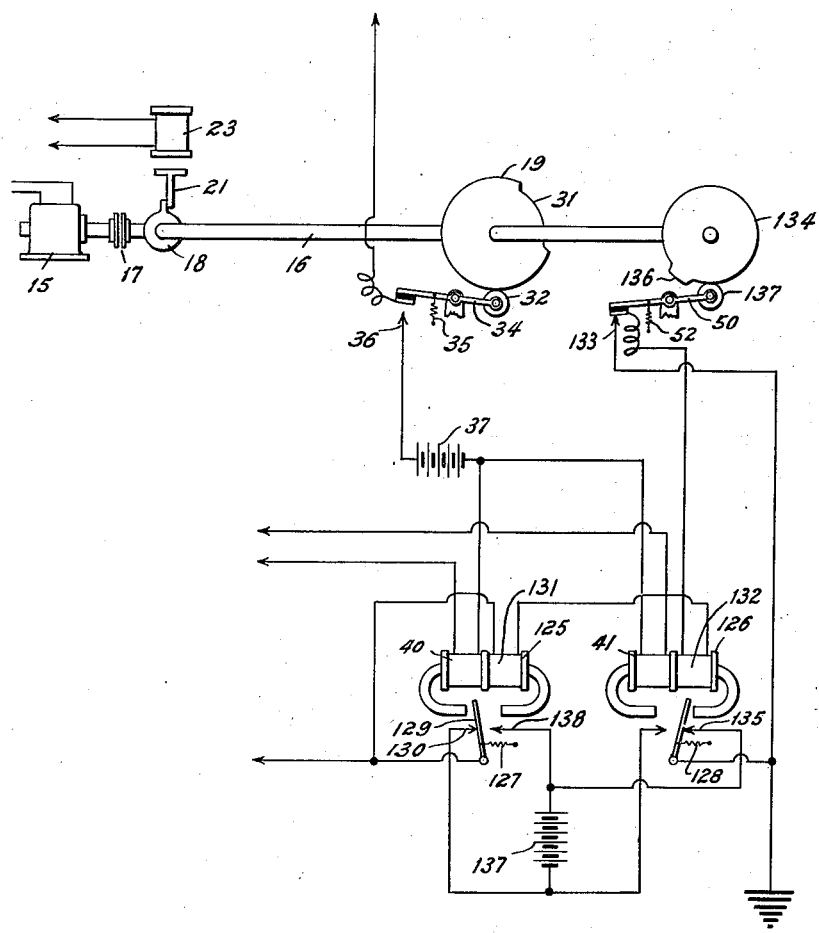

Patented Nov. 12, 1929

1,735,473

UNITED STATES PATENT OFFICE

NELSON J. PERRYMAN, OF MONTCLAIR, NEW JERSEY, ASSIGNOR TO ALL AMERICA CABLES, INC., OF NEW YORK, N. Y., A CORPORATION OF NEW YORK

ELECTRICAL SYSTEM

Application filed September 18, 1924. Serial No. 738,363.

This invention relates to an electrical system, with regard to its more specific features to a generating system for automatically re-transmitting cable signals.

An object of this invention is to permit the re-transmission of cable signals of definite predetermined characteristics in response to received impulses in which those characteristics may have become more or less obscure.

A further object is to permit the re-transmission of cable signals which depend for their identification upon the duration of individual impulses in such a manner that the duration of the impulse is automatically corrected.

Another object of this invention is to provide a system by which a signal impulse can be transmitted in response to a received signal impulse but of a duration independent of the received impulse.

A further object is to provide a device which will be responsive to received signal impulses at certain definite spaced intervals of time and shall be independent of the intermediate value of those impulses.

Other objects of the invention will in part be obvious and will in part appear hereinafter.

In the transmission of cable messages it is customary to employ signal impulses of opposite polarity but of uniform duration to represent the dots and dashes of the signal code, these following each other in direct isochronous sequence to represent letters while the various letters are separated by spaces equal to the space allowed for a dash or dot. When such messages are transmitted through a long cable, difficulty is experienced by reason of the electrical constants of the cable in that the beginning of each impulse is delayed and the impulse is prolonged after the time when the signal is intended to have ceased.

Furthermore, a signal which is transmitted as a series of similar impulses in immediate succession becomes blurred into a single continuous impulse and it becomes necessary to determine the number of such successive impulses by the time duration of the received blurred impulse. By reason of this fact, the delay in the termination of a signal may tend to obscure the number of such impulses intended. This is particularly true where a cable message is relayed automatically two or three times in succession where all such errors become cumulative.

In accordance with this invention, the received impulse is caused to start the transmission of a new impulse but the duration of that new impulse is determined independent of the received impulse. By reason of the delay in the beginning of each signal impulse as received, the re-transmitting mechanism is adapted to determine the characteristic of the transmitting impulse a predetermined interval of time after the commencement of the impulse, and this interval is sufficient to enable the character of the new impulse to be established unhindered by any undue delay in the termination of the old; that is although a received impulse might continue into the space intended for the next signal, yet the character of the next signal will not be determined until the expiration of the predetermined interval when the holdover portion of the previous signal will have had time to die away.

This invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 2 is a modification; and

Fig. 3 is a modified detail.

Figure 1:
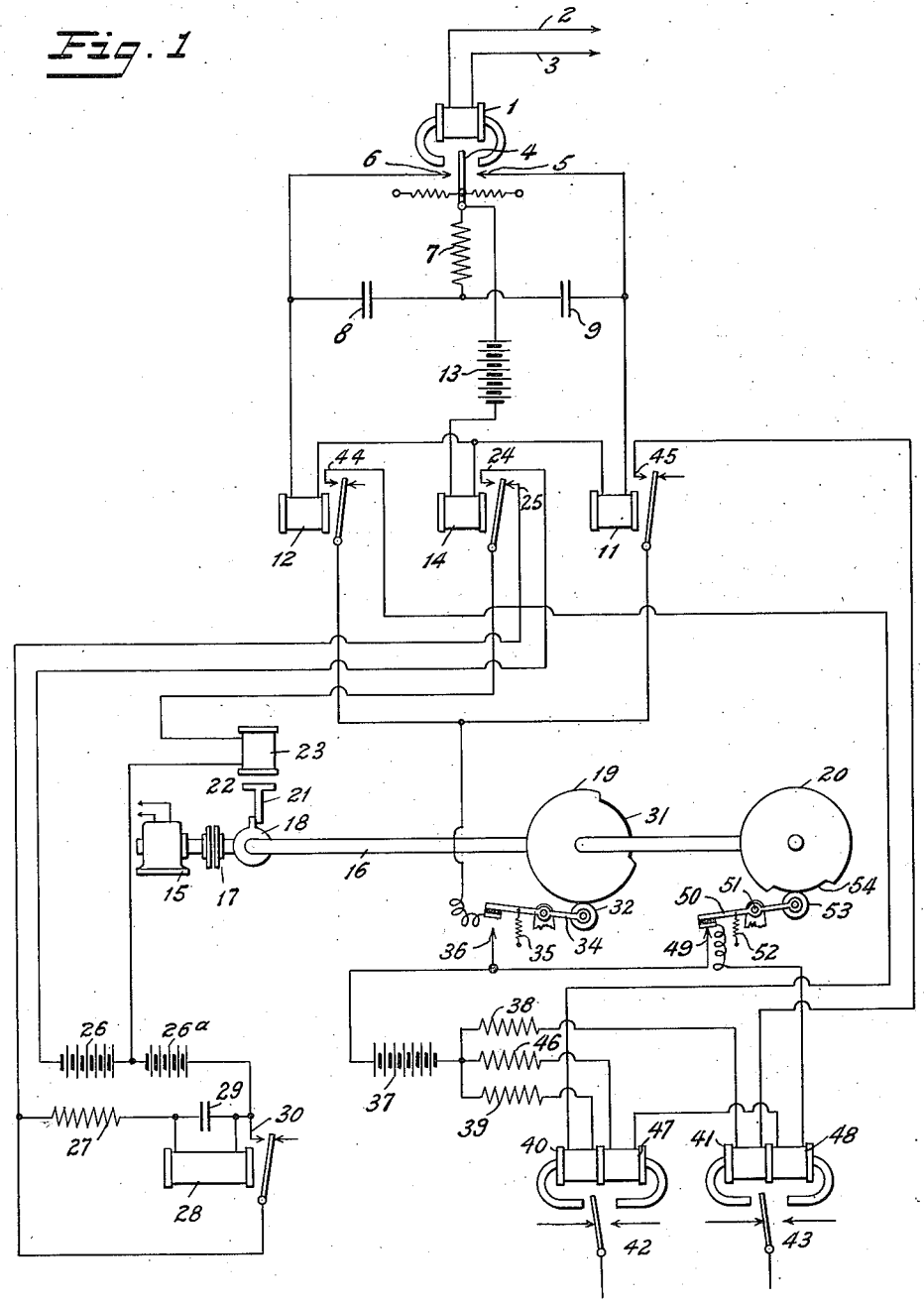
Figure 1 is a diagrammatic view showing an installation embodying this invention.

In the particular embodiment of Fig. 1, the numeral 1 designates a polarized relay intended to receive incoming signals and adapted to be connected to the cable as at 2, 3. This relay 1 has its polarized tongue 4 biased to remain in a central position but adapted to make contact as at 5 or 6 depending upon the polarity of the incoming signal. A means is preferably employed to quench the spark at the contacts and as shown resistance 7 in series with condensers 8, 9 are employed in shunt across the contacts respectively.

The numerals 11, 12 designate relays which are in series respectively with the contacts 5 and 6 and are connected to a main battery 13 through the actuating coil of a relay 14. In this manner, either relay 11 or 12 is actuated depending upon the polarity of the incoming signal, but the relay 14 is actuated by every signal regardless of its polarity. The relays 11 and 12 are control relays for the transmission of positive and negative impulses respectively while the relay 14 actuates the synchronous apparatus.

The original transmitted signal customarily comprises a series of impulses in definite isochronal relation, and in accordance with certain aspects of this invention there is provided a motor device, which is diagrammatically represented on the drawing at 15, arranged to operate substantially synchronously with the transmitted signal. This motor is adapted to drive a shaft 16 by means of a friction clutch 17 and is preferably arranged to make substantially one complete revolution for each time unit of the original signal. This shaft 16 carries a detent 18 and timing cams 19 and 20. The detent 18 is for the purpose of causing the timing mechanism to commence moving at the beginning of a signal impulse. The cam 19 is for the purpose of commencing the transmission of a signal and the cam 20 is for the purpose of causing the termination of the transmitted signal impulse. The relative setting of the detent 18 and the shape and setting of the cams 19 and 20 determines the timing of the beginning and ending of the transmitted signal.

A plunger 21 is arranged in position to engage the detent 18 to restrain the movement of the shaft 16 in spite of the continued rotation of the motor mechanism and a neutrally biased polarized relay 22 is arranged so that when its coil 23 is energized in one direction the plunger will be positively moved into the path of the detent and when energized in the other direction, it will be positively withdrawn from that pathway. The front contact 24 of the relay 14 connects the coil 23 across one-half, 26, of a split battery to cause the relay 22 to withdraw the plunger 21 from the path of the detent 18 and permit the starting of the synchronous mechanism.

The rear contact 25 of the relay 14 is connected in series with one-half 26ª of a split battery and a resistance 27 and a relay 28. A condenser 29 is in parallel with the relay 28 while a front contact 30 of the relay 28 bridges across the resistance 27 and the relay 28. This current, however, due to the resistance 27 is insufficient to operate the relay 22. It is, however, sufficient to operate the relay 28 as soon as the potential has been built up across the condenser 29, when the relay 28 is operated, the contact 30 by shunting the resistance 27 so increases the current through the relay 22 that the plunger 21 is forced down into the path of the detent 18.

The relay 22 is neutrally biased so that it will not operate in either direction until positively controlled by the current. This arrangement including the resistance 27 and the condenser 29 and relay 28 delays the return of the plunger 21 so that if a signal of one polarity follows immediately upon a signal of the opposed polarity and at the zero point, the relay 14 should instantaneously close upon its back stop 25, nevertheless the plunger 21 will not be dropped because the contact will be again broken at 25 before it has had the opportunity to do so.

The relays 14, 22 and 28 are adjusted so that when dots and dashes follow each other normally to form one signal letter in the recorder code, the plunger 21 is held withdrawn while at the end of the signal the relays 11, 12 and 14 are deenergized and their armatures rest upon their back stops. The relay 14 will then cause the relay 28 to operate to cause the relay 22 to thrust the plunger 21 forward in the pathway of the detent 18 as has been described. Should the motor slightly overrun to cause the detent 18 to reach the plunger 21, the shaft will be held from rotation until synchronism is corrected.

As illustrated, the control relays 11 and 12 do not directly transmit the new signal impulse, but they determine its characteristic. The actual transmitting is controlled by the synchronous mechanism in the following manner:

The cam 19 is provided with a cut-out as shown at 31, which is in position to engage a roller 32 on a lever 34 at a predetermined length of time after the lifting of the plunger 21, which length of time is determined by the angular spacing between the normal position of the roller 32 and the cut-out 31. This length of time is the interval between the time for the beginning of the received impulse and the time when the retransmitted impulse is sent.

The lever 34 is urged downwardly by a spring 35, and is adapted when in its downward position to make a contact at 36. This contact is in series with a battery 37 through control resistances 38 and 39 with the actuating coils 40 and 41 of neutrally biased polarized relays 42 and 43, which constitute the actual transmitting relays.

The transmitting device is as follows:

The circuit from the relay 42 is in series with a contact 44 upon the relay 12, whereas the circuit from the relay 41 is in series with a contact 45 upon the relay 11; the return of both said circuits being through the circuit controller 36. In this manner when the circuit is closed at 36 by the cam 19, if both control relays 11 and 12 be open, neither of the transmitting relays 42 and 43 will be actuated, but if at the time of closing the contact 36 one of the control relays, as for example the relay 12, be actuated by the incoming signal, the circuit will be closed through the contact 44 through the coil 40 to actuate the polarized relay 42 to commence the transmission of a sending impulse of polarity corresponding to the received impulse.

The battery 37, however, is also connected through a resistance 46 with restoring coils 47 and 48 upon the relays 42 and 43, and this circuit is carried through a contact 49 and an arm 50 and pivoted at 51. This arm 50 is urged downwardly by a spring 52 and is raised by a roller 53 normally bearing upon the periphery of the cam 20. This cam also, however, carries a cut-out portion 54 to cause the closing of the contact. As soon therefore as this cut-out portion 54 reaches the roller 53, contact is made at 49, completing the circuit through the restoring coils 47 and 48, thereby bringing the tongues of both polarized relays 42 and 43 to the normal position.

With the circuit as above described, it will be seen that the incoming signal will actuate the polarized relay 1 to complete the circuit through either relay 11 or 12, dependent upon its polarity and through the relay 14. If it be the relay 11 which is closed, it at once closes the contact 45, but this is without effect by reason of the fact that the circuit through the transmitting relays is open at the contact 36. At the same time, however, the actuation of the relay 14 closes contact at 24 to actuate the relay 22 to withdraw the plunger 21 and start the rotation of the timing mechanism. At this instant, although the received signal has commenced, no signal will be transmitted until the cut-out portion 31 reaches the roller 32 to permit contact to be made at 36. Thereupon if the relay 11 is still closed, the relay 43 will be actuated to commence the transmission of the signal.

By reason of the type of relay employed in this particular embodiment, the transmitted impulse will thereafter be continued, irrespective of the received impulse, so long as the tongue of the relay 43 is not positively restored. For this reason the duration of the signal is not dependent upon the received impulses. As soon, however, as the cut-out portion 54 of the cam 20 reaches the roller 53, a circuit will be made at 49 to actuate the restoring coils 47 and 48, thus terminating the impulse. It will thus be seen that a definite signal impulse of definite duration is transmitted by the apparatus the time of which is completely independent of the received impulses.

If however at the time of actuation of the circuit closer 36, the relays 11 and 12 be both deenergized by reason of the dying away of the received impulse neither relay 42 nor 43 will be operated and a space will be transmitted.

In the diagram of Fig. 2 those elements which are the same as the corresponding elements of the system of Fig. 1 bear the same numerals and hence need not be again described in detail. As here illustrated, separate relay tongues 104 and 104$^a$ are employed to respond to the positive and negative impulses of the received signal as shown at 104 and 104$^a$.

The front contact 105 of the tongue 104$^a$ controls the relay 11 and the front contact 106 of the tongue 104 controls the relay 12, these relays being operated by the battery 13 as before. For the purpose of quenching the spark on opening the contact, there is placed in series with each of the contacts 105 and 106, a high resistance 107, 107$^a$ which are each of a value to reduce the current through the relays 11 and 12 to make it insufficient to hold the relays in the closed position, but sufficient materially to reduce the spark at the terminals.

In this form of the apparatus an insulating block 108, 109 carrying a contact plate 110, 111 is carried by the tongue of each of the relays 11 and 12 in position to contact with the back stops 112 and 113 when the relays are open. These back contacts are connected in series between the battery and the relay 14 as for example by connecting a contact plate 110 with the battery, connecting the back contact 112 with the back contact 113 and connecting the contact plate 109 with the coil of the relay 14. In accordance with this arrangement whenever both relays 11 and 12 are deenergized current flows through the relay 14 to make contact at 114 through the relay 22 and one-half, 26$^a$, of a split battery to move the plunger 21 into the path of the detent 18. As soon, however, as either relay 11 or 12 is energized current from the relay 14 is broken and the tongue falls against the back stop 115 completing the circuit through the relay 22 and the opposite half, 26, of the split battery, to energize the relay to raise the plunger 21 and permit the rotation of the synchronous mechanism.

A suitable resistance of 107$^b$ may be connected across the gap of the contacts 110, 113 to reduce the sparking when the circuit is opened. As illustrated in Figure 2, the delaying mechanism including the elements 27, 28, 29 and 30 has not been shown but it is obvious that they may be included if desired.

In the modification illustrated in Fig. 3, the mechanism for commencing the transmission of a signal is substantially the same as in Figure 1, but the relays 125 and 126 performing the general functions performed by the relays 42 and 43 are biased in one direction as by means of springs 127 and 128. The operating current as before, passes through the contact 36 and the coils 40 and 41. If the relay 125 be energized, the lever 129 is attracted toward the left-hand contact 130, whereupon circuit is completed from the battery 137 through the contact 130, through coils 131, 132, of the relays 125 and 126 respectively, through a contact 133 controlled by a cam 134 corresponding to the cam 20, and returning to the battery through the back contact 135 of the relay 126, thus causing the transmission of a sending impulse. As soon, however, as the projection 136 upon the cam 134 reaches the roller 137 corresponding to the roller 53, the circuit is opened at 133 whereupon the spring 127 retracts the lever 129 to bring it into contact with the back stop 138 of the relay 125. At this time, both relays being in contact with the back stops, the cable is grounded and the sending of the impulse is definitely stopped. This termination of the impulse by definitely grounding the cable assists in freeing the cable of the electric charge and hence assists in preventing the continuance of a signal impulse after it is intended to cease.

It will be seen that by the above construction, a received signal, whatever its character, will be separated into and re-transmitted as definite signals of predetermined length and unless the errors of the original are in excess of the predetermined allowance, the re-transmitted signal will possess precisely the characteristics of the original. Furthermore in commercial operation, the errors arising from a single transmission are not serious. Danger arises from the accumulation of the error in repeated transmission. This in accordance with the present system is completely avoided since each relaying is a completely new transmission.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A device of the character described comprising, in combination, a timing mechanism, means responsive to a received impulse for starting said timing mechanism at the beginning of each received impulse, a selecting means, means to render said selecting means effective a predetermined time after the commencement of the signal impulse, means operated by the timing mechanism, and controlled by the selecting mechanism for transmitting a signal impulse, and means for independently controlling the time of starting and stopping said signal impulse.

2. A device of the character described, comprising, in combination, a receiving element adapted to receive signal impulses in definite timed sequence, a pair of relays adapted to be energized by positive and negative impulses in said receiving apparatus respectively, a third relay in series with both said relays to be operated by both said impulses, a motor element adapted to move at speed in excess of synchronism with the received impulses, a timing mechanism frictionally connected to said motor and a detent for restraining the movement of said timing mechanism, means operable by the operation of said third mentioned relay for releasing said detent to permit the movement of the timing mechanism, means operated by the timing mechanism for starting the transmission of a signal comprising a circuit closing device operated by said timing mechanism a predetermined time after the commencement of its operation, a pair of transmitting relays connected in series respectively with front contacts upon said first mentioned relays both of said transmitting relays including within their circuit said circuit making device upon said timing mechanism, means upon said timing mechanism for restoring the position of said transmitting relays, and means for delaying the restoration of said detent to stop the movement of said timing mechanism a complete period after the termination of said signal.

3. A device of the character described, comprising, in combination, a receiving means, transmitting means associated with said receiving means to transmit signals corresponding to the received signals, timing mechanism, means connected with the timing mechanism for starting and stopping the transmission by said transmitting means, means for correcting the synchronism of said timing means at the close of each impulse period, and means to restrain the operation of said correcting means during an uninterrupted succession of received impulses.

4. A device of the character described, comprising, in combination, means for receiving an incoming signal impulse, a timing mechanism, means actuated by the received impulse for starting said timing mechanism, means responsive to the received impulse for starting the transmission of a signal, separate means actuated by the timing mechanism for terminating the transmission of the signal, and means for adjusting the time interval between the commencement of a received impulse and the commencement of a transmitted impulse.

5. A device of the character described, comprising, in combination, means for receiving an incoming signal impulse, a timing mechanism, means actuated by the received impulse for starting said timing mechanism, means responsive to the received impulse and said timing mechanism for starting the transmission of a signal, separate means actuated by the timing mechanism for terminating the transmission of the signal, means for adjusting the time interval between the commencement of a received impulse and the commencement of a transmitted impulse, and means for independently adjusting the impulse duration.

In testimony whereof I affix my signature.

NELSON J. PERRYMAN.